US008024809B2

(12) United States Patent
Adams et al.

(10) Patent No.: US 8,024,809 B2
(45) Date of Patent: Sep. 20, 2011

(54) SYSTEM AND METHOD FOR DELETING CONFIDENTIAL INFORMATION

(75) Inventors: Neil Adams, Waterloo (CA); Michael S. Brown, Waterloo (CA); Michael K. Brown, Kitchener (CA); Herb Little, Waterloo (CA); Scott Totzke, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1668 days.

(21) Appl. No.: 11/097,147

(22) Filed: Apr. 4, 2005

(65) Prior Publication Data
US 2006/0236126 A1 Oct. 19, 2006

(51) Int. Cl.
*G06F 21/00* (2006.01)
(52) U.S. Cl. .......... 726/26; 380/270; 713/172; 713/193; 726/9; 726/20
(58) Field of Classification Search .............. 380/33–34, 380/247–250, 270–275; 455/410–411, 434, 455/445, 161.3, 226.3
See application file for complete search history.

(56) References Cited

U.S. PATENT DOCUMENTS

| 5,457,748 | A * | 10/1995 | Bergum et al. ............... 380/270 |
| 6,594,759 | B1 | 7/2003 | Wang |
| 2001/0046839 | A1* | 11/2001 | Latva-Aho et al. .......... 455/3.05 |
| 2002/0154776 | A1* | 10/2002 | Sowa et al. .................... 380/247 |
| 2003/0174839 | A1 | 9/2003 | Yamagata et al. |
| 2003/0183691 | A1 | 10/2003 | Lahteenmaki et al. |
| 2004/0229621 | A1* | 11/2004 | Misra ........................... 455/445 |
| 2005/0132183 | A1* | 6/2005 | Gearhart ....................... 713/150 |
| 2005/0176460 | A1* | 8/2005 | Hamanaga et al. ........ 455/550.1 |
| 2006/0236117 | A1 | 10/2006 | Lazaridis et al. |
| 2006/0245593 | A1* | 11/2006 | Nakano et al. ................. 380/277 |

FOREIGN PATENT DOCUMENTS

| DE | 19947574 | 4/2001 |
| EP | 0885417 | 12/1998 |
| EP | 1398934 | 3/2004 |

OTHER PUBLICATIONS

Madge WLAN Enterprise Access Server 2 Data Sheet, Part Nos. 95-90, 95-91, published 2005 at www.madge.com/products/products-95-90.aspx.
Figiel, B , Extended European Search Report for EP 05102622.7, Sep. 13, 2005.
Figiel, B , Examination Report for EP 05102622.7, Jul. 7, 2006.
Madge, , "WLAN Enterprise Access Server 2 Part No. 95-90 95-91 Data Sheet", 2005.
Hayami, Jamie , First Office Action for CA 2539405, Sep. 11, 2008.
Xueqing Li, Sara , Second Office Action for CA 2539405, Aug. 26, 2009.

* cited by examiner

*Primary Examiner* — Minh Dinh
*Assistant Examiner* — Venkat Perungavoor
(74) *Attorney, Agent, or Firm* — Integral Intellectual Property Inc.; Miriam Paton

(57) ABSTRACT

A system includes a first wireless-enabled device that transparently stores confidential information and a second wireless-enabled device that stores the same confidential information. The confidential information is to be used to secure a wireless communication link between the first device and the second device. One or both of the first device and the second device is to delete the confidential information upon fulfillment of one or more conditions related to the communication link.

10 Claims, 2 Drawing Sheets

SYSTEM AND METHOD FOR DELETING CONFIDENTIAL INFORMATION

BACKGROUND OF THE INVENTION

In some devices, confidential information is stored using content protection, for example, encrypted with a password which the user of the device enters via a user input interface. However, in other devices, for example those without a suitable user input interface, confidential information may be stored without any protection, that is, transparently, or "in the clear". If this device is stolen, the confidential information may be revealed by probing the memory in which the confidential information is stored.

In general, wireless communication is insecure and susceptible to attacks. Cryptographic techniques may be employed to secure a wireless communication link. In symmetric-key systems (also known as "secret-key systems"), a single, common cryptographic key is stored by two communication devices. In public-key systems (also known as "public-private pair systems"), each communication device stores its own private key and freely distributes its own public key. If the symmetric key or either or both of the private keys is not kept secret, the security of the communication between the two devices is compromised. A hostile third party with knowledge of the secret may impersonate one or both of the devices.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

Figure 1:
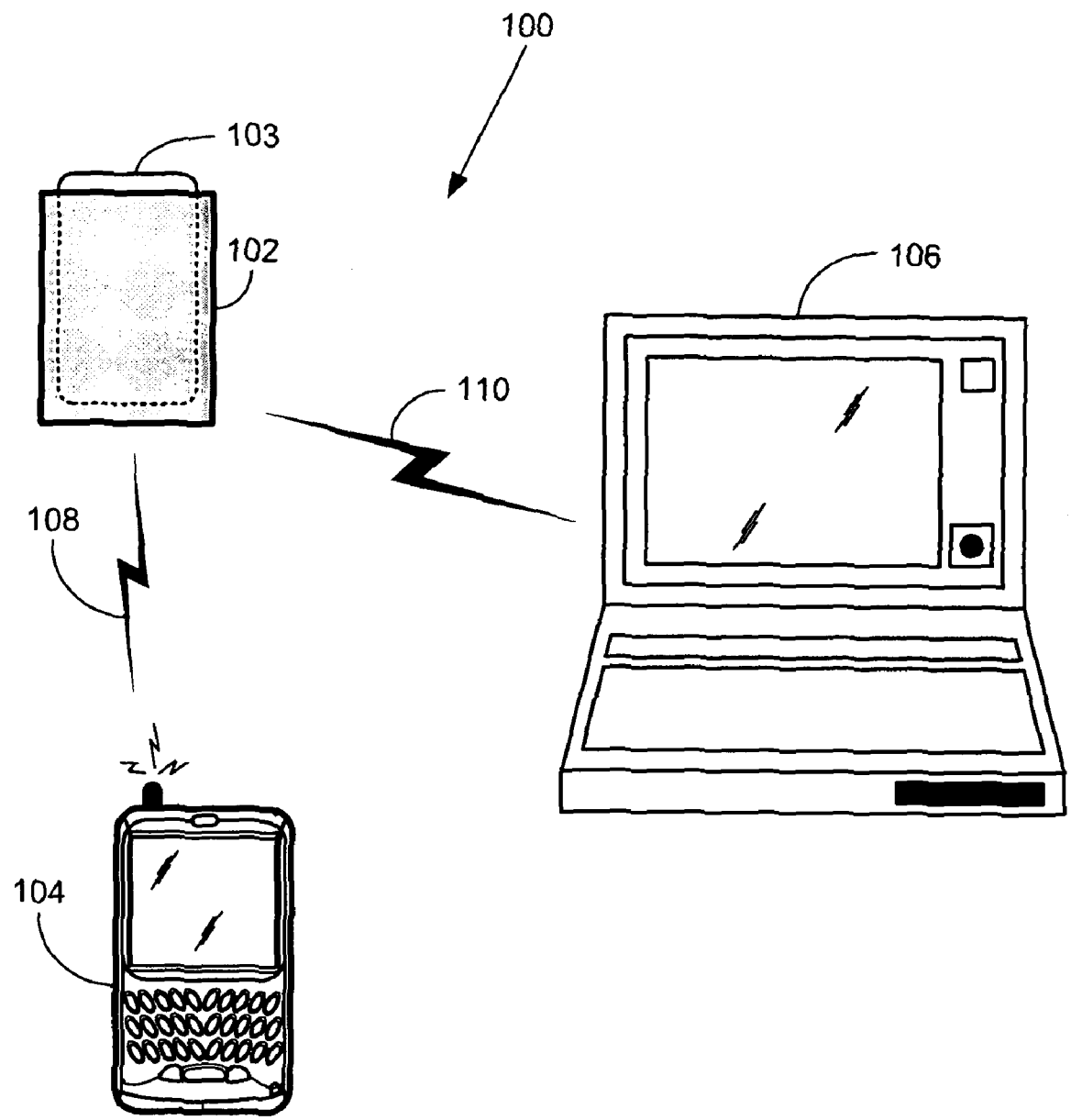
FIG. 1 is a schematic diagram of an exemplary system, according to some embodiments of the invention.

FIG. 1 is a schematic diagram of an exemplary system, according to some embodiments of the invention. A system 100 includes a wireless-enabled smart card reader 102, a wireless-enabled mobile device 104, and a wireless-enabled personal computer 106. A smart card 103 is shown inserted into smart card reader 102.

Smart card reader 102 and mobile device 104 may communicate via a wireless communication link 108, and smart card reader 102 and personal computer may communicate via a wireless communication link 110. In this description and the claims, a wireless communication link may include one or more wired portions and/or one or more optical portions. As shown in FIG. 1, communication links 108 and 110 are wireless communication links, for example Bluetooth® communication links.

In addition, communication link 108 may be a direct communication link between smart card reader 102 and mobile device 104, or may include any combination of additional communication devices (not shown) such as gateways, routers, switches and the like. Similarly, communication link 110 may be a direct communication link between smart card reader 102 and personal computer 106, or may include any combination of additional communication devices (not shown) such as gateways, routers, switches and the like. Communication links 108 and 110 may be accessible to other devices and may be susceptible to intrusions and unwanted attacks.

Smart cards are personalized security devices, defined by the ISO7816 standard and its derivatives, as published by the International Organization for Standardization. A smart card may have a form factor of a credit card and may include a semiconductor device. The semiconductor device may include a memory that can be programmed with a secret key and with an authentication certificate, and may include a decryption engine, e.g., a processor and/or dedicated decryption logic. A smart card may include a connector for powering the semiconductor device and performing serial communication with an external device. Alternatively, smart card functionality may be embedded in a device having a different form factor and different communication protocol, for example a Universal Serial Bus (USB) device.

The person whose security information is stored on smart card 103 may use smart card reader 102 for identification and to digitally sign and/or decrypt messages sent by mobile device 104.

For example, mobile device 104 may be able to send and receive e-mail messages via an e-mail server (not shown). If, for example, the Secure Multipurpose Internet Mail Extensions (S/MIME) protocol is used, e-mail messages received at mobile device 104 are encrypted using a symmetric algorithm with a random session key generated by the sender of the e-mail message. The e-mail message also includes the session key, encrypted using the public key of the recipient. Upon receipt of an encrypted e-mail message, mobile device 104 may extract the encrypted session key and send it to smart card reader 102 via communication link 108. Smart card reader 102 may send the encrypted session key to smart card 103, and the decryption engine of smart card 103 may decrypt the encrypted session key using the recipient's private decryption key, which is stored in smart card 103. Smart card reader 102 may retrieve the decrypted session key from smart card 103 and forward it to mobile device 104 via communication link 108 so that mobile device 104 can decrypt the received e-mail message. The smart card 203 may prevent unauthorized use of the recipient's private decryption key by requiring that a password or personal identification number (PIN) be supplied before allowing the decryption operation to proceed.

Similarly, to add a digital signature to an e-mail message being sent by mobile device 104, mobile device 104 may send a hash of the contents of the e-mail message to smart card reader 102 over communication link 108. Smart card reader 102 may pass the hash to smart card 103, which may produce a digital signature from the hash and the sender's private signing key, which is stored in smart card 103. Smart card 103 may then pass the digital signature to smart card reader 102, which may forward it to mobile device 104 via communication link 108 so that mobile device 104 can transmit it along with the e-mail message to the e-mail server. Again, smart card 103 may prevent unauthorized use of the recipient's private signing key by requiring that a password or PIN be supplied before allowing the signing operation to proceed.

The unencrypted session key should be sent securely over communication link 108 from smart card reader 102 to mobile device 104 to prevent a third party from retrieving the session key from communication link 108. Similarly, the hash to be signed should be sent authentically over communication link 108 from smart card reader 102 to mobile device 104 to prevent a third party from modifying the hash and thereby causing smart card 203 to produce a signature using a hash different from the hash of the intended message.

Smart card reader 102 and mobile device 104 may each store a common, symmetric key and use a symmetric algorithm to secure communications over communication link 108. Alternatively, smart card reader 102 and mobile device 104 may store their own private keys and each other's public keys, and use an asymmetric algorithm to secure communications over communication link 108. If smart card reader 102 lacks the means to implement content protection, then a secret (the symmetric key shared by mobile device 104 and smart card reader 102, or the private key of smart card reader 102) may be stored transparently in smart card reader 102.

The person whose security information is stored on smart card 103 may wish to digitally sign outgoing e-mail sent from personal computer 106 or to decrypt incoming encrypted e-mail received at personal computer 106. This will require personal computer 106 to communicate with smart card reader 102 in much the same way as mobile device 104 communicates with smart card reader 102 as described above. For this purpose, or for other security-related measures (e.g., to permit the person to use personal computer 106), communication link 110 between personal computer 106 and smart card reader 102 will need to be secured.

Smart card reader 102 and personal computer 106 may each store a common, symmetric key and use a symmetric algorithm to secure communications over communication link 110. Alternatively, smart card reader 102 and personal computer 106 may store their own private keys and each other's public keys, and use an asymmetric algorithm to secure communications over communication link 110. If smart card reader 102 lacks the means to implement content protection, then a secret (the symmetric key shared by personal computer 106 and smart card reader 102, or the private key of smart card reader 102) may be stored transparently in smart card reader 102.

Any secret stored transparently in smart card reader 102 is vulnerable to discovery if smart card reader 102 is stolen and its memory is probed. According to some embodiments of the invention, a secret used to secure wireless communications between two devices, at least one of which stores the secret transparently (e.g., smart card reader 102) is deleted from time to time. It is sufficient to delete the secret from one of the two devices to disable secure communications between the two devices. In order to resume secure communications, a new secret will need to be established and, in the case of a symmetric key, shared securely between the two devices.

If the secret is deleted too frequently, this creates a burden on the rightful user of the two devices to establish and share a new secret. Yet, if the secret is deleted too infrequently, security may be significantly compromised if the device storing the secret transparently is stolen, the secret is exposed and traffic over the communication link is intercepted or falsified.

The following is a non-exhaustive list of examples of rules that affect when the secret is deleted. In order for the secret to be deleted, the condition embodied in the rule should be fulfilled. If a combination of two or more rules is in effect, then it is generally sufficient that one of the conditions be fulfilled for the secret to be deleted.

(1) General Timeout. The secret may be deleted once a predefined period of time, for example, 24 hours, has elapsed since the secret was generated.

(2) Device Inactivity. The secret may be deleted once a predefined period of time has elapsed since the last communication between the mobile device and the device which stores the secret transparently (e.g., smart card reader 102) and the other device (e.g., mobile device 104 or personal computer 106), even though the communication link (e.g., communication link 108 or 110) between the device which stores the secret transparently and the other device remains enabled. Exemplary values for this predefined period of time are 8 hours for mobile device 104 and 24 hours for personal computer 106.

In these two cases above, if the device which stores the secret transparently is stolen, the thief has less than the predefined period of time to carry out an attack before the secret is deleted.

(3) Loss of Connection over Communication Link. The secret may be deleted once a predefined period of time has elapsed since the loss of connectivity over the communication link (e.g., communication link 108 or 110) between the device which stores the secret transparently (e.g., smart card reader 102) and the other device (e.g., mobile device 104 or personal computer 106). Exemplary values for this predefined period of time are 5 minutes for mobile device 104 and 24 hours for personal computer 106.

In this case above, if the device which stores the secret transparently is stolen, the thief has less than the predefined period of time to carry out an attack before the secret is deleted, and the attack must take place with the device which stores the secret transparently within range of the other device.

Alternatively, the secret may be deleted once there is a loss of connectivity over the communication link between the device which stores the secret transparently and the other device.

(4) Decline in Signal Strength. The secret may be deleted once the strength of a wireless signal received by the device which stores the secret transparently (e.g., smart card reader 102) falls below a predetermined level, where the signal originates at the other device (e.g., mobile device 104 or personal computer 106). Alternatively, the secret may be deleted once the received strength of a wireless signal originating at the device which stores the secret transparently (e.g., smart card reader 102) and received at the other device (e.g., mobile device 104 or personal computer 106) falls below a predetermined level. Alternatively, the secret may be deleted once the strength of the received wireless signal remains below the predetermined level for a predefined period of time.

(5) Number of transactions. The secret may be deleted once a predefined number of transactions, for example, 100, have occurred between the device which stores the secret transparently (e.g. smart card reader 102) and the other device. A non-exhaustive list of examples for transactions includes decrypting an e-mail, signing a message, and unlocking the other device. For example, a value of 0 would imply no limit. In this case, if the device which stores the secret transparently is stolen, the thief has access to only a limited amount of data encrypted with the secret.

In each of these rules above, the secret may be deleted at either or both of the devices. Moreover, rules with different restrictiveness in the conditions could be applied separately to two or more secrets of different confidentiality that are stored in the devices. For example, the predefined period of time could be shorter for a key of more confidentiality than for a key with less confidentiality. In another example, the predefined level for signal strength could be higher for a key of more confidentiality than for a key of less confidentiality. In a further example, the number of transactions could be lower for an encryption key than for owner information.

(6) Smart card removal timeout. The secret may be deleted once a predefined period of time, for example, 5 minutes, has elapsed since the removal of smart card 103 from smart card reader 102. In this case, if the rightful user removes smart card 103 from smart card reader 102 to use smart card 103 elsewhere, a thief who steals the "empty" smart card reader 102 has less than the predefined period of time to carry out an attack before the secret is deleted. The predefined period of time may be zero time. The secret may be deleted at smart card reader 102, and also at the other device once smart card reader 102 informs the other device of the removal of smart card 103, if desired.

In each of the rules above having a predefined period of time, the predefined period of time may be configured by the user on the mobile device or the stationary device and transferred to the device which stores the secret transparently, or the predefined period of time may be set as an Information Technology (IT) policy in an organization. Similarly, the predefined number of transactions may be configured by the user on the mobile device or the stationary device and transferred to the device which stores the secret transparently, or the predefined number of transactions may be set as an IT policy in an organization.

Figure 2:
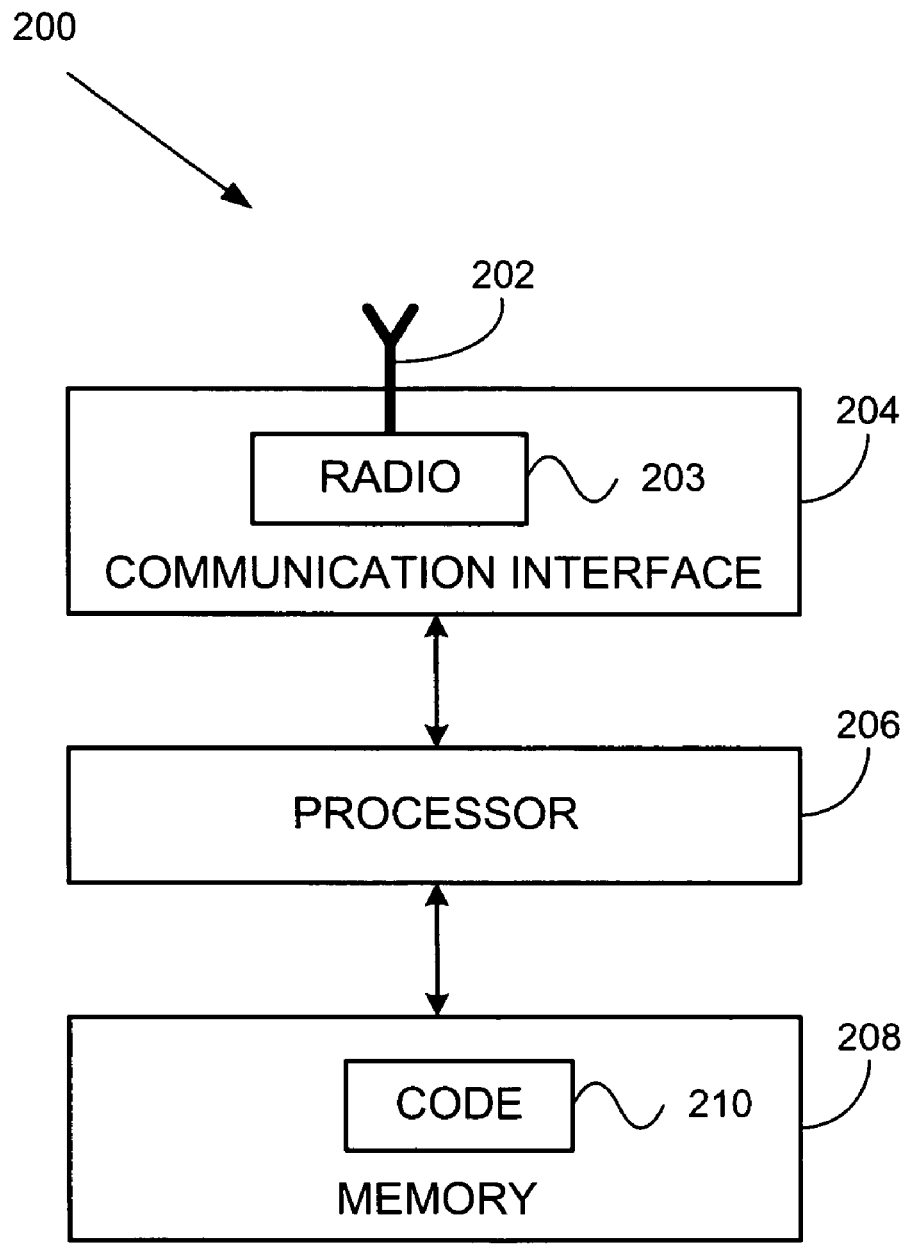
FIG. 2 is a block diagram of an exemplary device in the system of FIG. 1, according to some embodiments of the invention.

FIG. 2 is a block diagram of an exemplary device 200; according to some embodiments of the invention. A non-exhaustive list of examples for device 200 includes a cellular phone, a personal digital assistant (PDA), an electronic mail (Email) client, a gaming device, a laptop computer, a notebook computer, a desktop computer, a server computer, and any other suitable apparatus. Device 200 may be a mobile device such as mobile device 104, or a personal computer such as personal computer 106, or may include smart card reader functionality, such as that of smart card reader 102.

Device 200 includes an antenna 202. A non-exhaustive list of examples for antenna 202 includes a dipole antenna, a monopole antenna, a multilayer ceramic antenna, a planar inverted-F antenna, a loop antenna, a shot antenna, a dual antenna, an omnidirectional antenna and any other suitable antenna.

Device 200 includes a communication interface 204 including a radio 203 coupled to antenna 202. A non-exhaustive list of examples of wireless communication standards with which communication interface 204 is compatible includes the Institute of Electrical and Electronic Engineers (IEEE) for Wireless LAN MAC and Physical layer (PHY) 802.11a, b, g and n specifications or future related standards, the Bluetooth® standard, the Zigbee™ standard and the like.

Device 200 also includes a processor 206 coupled to communication interface 204. Device 200 also includes a memory 208, which may be fixed in or removable from device 200. Memory 208 may be coupled to processor 206 or partly embedded in processor 206. Communication interface 204 and processor 206 may be part of the same integrated circuit or in separate integrated circuits. Similarly, processor 206 and memory 208 may be part of the same integrated circuit or in separate integrated circuits.

A non-exhaustive list of examples for processor 206 includes a central processing unit (CPU), a digital signal processor (DSP), a reduced instruction set computer (RISC), a complex instruction set computer (CISC) and the like. Furthermore, processor 206 may be part of an application specific integrated circuit (ASIC) or may be a part of an application specific standard product (ASSP).

A non-exhaustive list of examples for memory 208 includes any combination of the following:

a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and c) magnetic devices, such as a hard disk, a floppy disk, a magnetic tape, and the like.

Memory 208 may store confidential information which is used to secure a communication link through communication interface 204 to another device that also stores the confidential information. At least one of device 200 and the other device stores the confidential information transparently.

Memory 208 may store executable code 210 which, when executed by processor 206, determines the confidential information from device 200 upon fulfillment of one or more conditions related to the communication link that the confidential information is to be used to secure. A non-exhaustive list of examples of rules that affect when the confidential information is deleted is given above.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A system comprising:
a first wireless-enabled device to transparently store confidential information; and
a second wireless-enabled device to store said confidential information,
wherein said confidential information is to be used to secure a wireless communication link between said first wireless-enabled device and said second wireless-enabled device, and
wherein one or both of said first wireless-enabled device and said second wireless-enabled device is configured to delete said confidential information if there is a lack of communication between said first wireless-enabled device and said second wireless-enabled device over said wireless communication link for at least a predefined period of time while said wireless communication link remains enabled.

2. A system comprising:
a first wireless-enabled device to transparently store confidential information, wherein said first wireless-enabled device includes smart card reader functionality; and
a second wireless-enabled device to store said confidential information,
wherein said confidential information is to be used to secure a wireless communication link between said first wireless-enabled device and said second wireless-enabled device, and wherein one or both of said first wireless-enabled device and said second wireless-enabled device is configured to delete said confidential information upon removal of a smart card from said first wireless-enabled device for at least a predefined period of time.

3. The system of claim 2, wherein one or both of said first wireless-enabled device and said second wireless-enabled device is configured to delete said confidential information upon removal of said smart card from said first wireless-enabled device.

4. A first device comprising:
a communication interface compatible with a wireless communication protocol;
a processor; and
a memory able to store confidential information that is to be used to secure a wireless communication link from said first device to a second device,
wherein said memory is configured to store executable code which, when executed by said processor, deletes said confidential information from said first device if there is a lack of communication between said first device and said second device over said wireless communication link for at least a predefined period of time while said wireless communication link remains enabled, and
wherein said second device stores said confidential information.

5. The device of claim 4, wherein said memory is configured to store said confidential information transparently.

6. A first device comprising:
a communication interface compatible with a wireless communication protocol;
a processor; and
a memory able to store transparently confidential information that is to be used to secure a wireless communication link from said first device to a second device,
wherein said first device includes smart card reader functionality,
wherein said memory is configured to store executable code which, when executed by said processor, deletes said confidential information from said first device upon removal of a smart card from said first device for at least a predefined period of time, and
wherein said second device stores said confidential information.

7. The first device of claim 6, wherein said executable code, when executed by said processor, deletes said confidential information upon removal of said smart card from said first device.

8. A method comprising:
using confidential information to secure a wireless communication link between a first wireless-enabled device that transparently stores said confidential information and a second wireless-enabled device that stores said confidential information;
detecting, while said wireless communication link remains enabled, a lack of communication between said first wireless-enabled device and said second wireless-enabled device over said wireless communication link for at least a predefined period of time; and
deleting said confidential information from one or both of said first wireless-enabled device and said second wireless-enabled device upon detecting said lack of communication for at least said predefined period of time.

9. A method comprising:
using confidential information to secure a wireless communication link between a first wireless-enabled device that includes smart card reader functionality and that transparently stores said confidential information and a second wireless-enabled device that stores said confidential information;
detecting removal of a smart card from said first wireless-enabled device; and
deleting said confidential information from one or both of said first wireless-enabled device and said second wireless-enabled device upon detecting said removal.

10. A method comprising:
using confidential information to secure a wireless communication link between a first wireless-enabled device that includes smart card reader functionality and that transparently stores said confidential information and a second wireless-enabled device that stores said confidential information;
detecting removal of a smart card from said first wireless-enabled device for at least a predefined period of time; and
deleting said confidential information from one or both of said first wireless-enabled device and said second wireless-enabled device upon detecting said removal for at least said predefined period of time.

* * * * *